(12) United States Patent
Sharma et al.

(10) Patent No.: US 10,977,703 B2
(45) Date of Patent: Apr. 13, 2021

(54) METHOD AND SYSTEM FOR DETERMINING CONFIDENCE OF A SELLER IN A USER MARKETPLACE

(71) Applicant: Mastercard International Incorporated, Purchase, NY (US)

(72) Inventors: Prashant Sharma, Madison, NJ (US); Manash Bhattacharjee, Jersey City, NJ (US); Joseph Hayes, Montclair, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 440 days.

(21) Appl. No.: 15/868,227

(22) Filed: Jan. 11, 2018

(65) Prior Publication Data
US 2019/0213652 A1    Jul. 11, 2019

(51) Int. Cl.
*G06Q 30/00*    (2012.01)
*G06Q 30/06*    (2012.01)
*G06F 16/951*   (2019.01)

(52) U.S. Cl.
CPC ....... *G06Q 30/0609* (2013.01); *G06F 16/951* (2019.01)

(58) Field of Classification Search
CPC .......................... G06Q 30/0609; G06F 16/951
USPC ...................................................... 705/26, 27
See application file for complete search history.

(56) References Cited

U.S. PATENT DOCUMENTS

| | | | |
|---|---|---|---|
| 10,554,649 B1* | 2/2020 | Fields | H04L 9/3263 |
| 10,715,531 B2* | 7/2020 | Thekadath | H04L 63/123 |
| 2015/0142595 A1* | 5/2015 | Acuna-Rohter | G06Q 30/06 705/21 |
| 2015/0302406 A1* | 10/2015 | Pastore | G06Q 40/02 705/44 |
| 2016/0217470 A1* | 7/2016 | Gerard | G06Q 20/4016 |
| 2016/0239888 A1* | 8/2016 | Silver | G06Q 30/0609 |

(Continued)

OTHER PUBLICATIONS

"Reputation based buyer strategies for seller selection in electronic markets," Beldona, Sandhya. ProQuest Dissertations and ThesesProQuest Dissertations Publishing; Dialog #250834933, 153pgs (Year: 2009).*

*Primary Examiner* — Robert M Pond
(74) *Attorney, Agent, or Firm* — Buchanan Ingersoll & Rooney PC (57) ABSTRACT

A method for providing a confidence score for a seller in an online marketplace includes: storing account profiles, each including one or more unique account identifiers for one or more online marketplaces; storing activity data entries, each including data for transactional activity in an online marketplace including a marketplace identifier, two or more transacting account identifiers, and activity data; receiving a confidence request that includes a specific account identifier and marketplace identifier; identifying a specific account profile that includes the specific account identifier; identifying a set of activity data entries where a transacting account identifier matches a unique account identifier in the specific account profile; determining a confidence score for the specific account profile based on the activity data included in the identified set of activity data entries; and transmitting the confidence score in response to the received confidence request.

20 Claims, 5 Drawing Sheets

(56) References Cited

U.S. PATENT DOCUMENTS

2019/0147431 A1* 5/2019 Galebach ............. G06Q 20/065
          705/44
2019/0289019 A1* 9/2019 Thekadath ............ H04L 9/3239

* cited by examiner

METHOD AND SYSTEM FOR DETERMINING CONFIDENCE OF A SELLER IN A USER MARKETPLACE

FIELD

The present disclosure relates to the measuring of confidence of participants in a user marketplace, specifically the use of transactional data to determine confidence in a buyer or seller in a user marketplace independent of user ratings or other subjective feedback.

BACKGROUND

With the advent of the Internet, it quickly gave rise to the start of online marketplaces that could match buyers to sellers. In many cases, the entity on each side of the transaction was kept anonymous to the other party. As a result, there would be little to no information available for one party to have confidence of the authenticity of the other party. In many instances, the marketplace may also have had little recourse for users that were defrauded or otherwise taken advantage of. To help alleviate these occurrences, many marketplaces provide users with the opportunity to rate and give feedback on other users. Such information became beneficial for a user to be confident in the other use they are transacting with and the authenticity of the product or service being transacted.

However, this information is only available for users that have already been involved in a significant number of transactions to have received feedback and ratings. Furthermore, the user must have confidence in the quality and authenticity of the ratings and feedback themselves. This may make it difficult for new users to participant in sufficient transactions to gain a suitable amount of feedback and ratings, and may also make other users wary of users with a low amount of ratings or feedback that may be manipulated or suspicious type of feedback. Thus, there is a need for a technological solution to provide for a suitable and trustworthy confidence score in a user in an online marketplace that relies on objective information beyond user-provided feedback and ratings.

SUMMARY

The present disclosure provides a description of systems and methods for providing a confidence score for a seller in an online marketplace. Activity on a user marketplace can be analyzed without regard for any user feedback or ratings, to provide a confidence score for a user based on objective data, such as the number of transactions made involving the user, frequency of refunds or disputes, times of transactions, etc. In addition, user accounts in an online marketplace will often use common data for identification of the account, such as a username, e-mail address, etc. For marketplaces where currency is exchanged via transaction accounts, information identifying such transaction accounts may be used. The methods and systems herein can identify related accounts across multiple user marketplaces to assist in the providing of a confidence score of a user in one of the marketplaces. For instance, an seller may be new to a marketplace and thus have no feedback, but may be well-established on several other marketplaces, providing significant confidence that the seller may be genuine. As a result, the methods and systems discussed herein can provide for accurate and beneficial confidence scores for users of an online marketplace that may be effective when feedback is unavailable and also more reliable and accurate than feedback that may be subject to fraud.

A method for providing a confidence score for a seller in an online marketplace includes: storing, in an account database of a processing server, a plurality of account profiles, wherein each account profile includes a structured data set related to a user account for at least one online marketplace including at least one or more unique account identifiers; storing, in an activity database of the processing server, a plurality of activity data entries, wherein each activity data entry includes a structured data set related to a transactional activity in one of a plurality of online marketplaces including at least a marketplace identifier, and two or more transacting account identifiers, and activity data; receiving, by a receiving device of the processing server, a confidence request from a computing device, wherein the confidence request includes at least a specific account identifier and a specific marketplace identifier; executing, by a querying module of the processing server, a query on the account database to identify a specific account profile where one of the included one or more unique account identifiers corresponds to the specific account identifier included in the received confidence request; executing, by the querying module of the processing server, a query on the activity database to identify a set of activity data entries where one of the two or more transacting account identifiers corresponds to one of the one or more unique account identifiers included in the identified specific account profile; determining, by a scoring module of the processing server, a confidence score for the specific account profile based on at least the activity data included in each of the activity data entries in the identified set of activity data entries; and electronically transmitting, by a transmitting device of the processing server, the determined confidence score to the computing device in response to the received confidence request.

A system for providing a confidence score for a seller in an online marketplace includes: an account database of a processing server configured to store a plurality of account profiles, wherein each account profile includes a structured data set related to a user account for at least one online marketplace including at least one or more unique account identifiers; an activity database of the processing server configured to store a plurality of activity data entries, wherein each activity data entry includes a structured data set related to a transactional activity in one of a plurality of online marketplaces including at least a marketplace identifier, and two or more transacting account identifiers, and activity data; a receiving device of the processing server configured to receive a confidence request from a computing device, wherein the confidence request includes at least a specific account identifier and a specific marketplace identifier; a querying module of the processing server configured to execute a query on the account database to identify a specific account profile where one of the included one or more unique account identifiers corresponds to the specific account identifier included in the received confidence request, and execute a query on the activity database to identify a set of activity data entries where one of the two or more transacting account identifiers corresponds to one of the one or more unique account identifiers included in the identified specific account profile; a scoring module of the processing server configured to determine a confidence score for the specific account profile based on at least the activity data included in each of the activity data entries in the identified set of activity data entries; and a transmitting device of the processing server configured to electronically transmit the determined confidence score to the computing device in response to the received confidence request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Providing Confidence Scores in an Online Marketplace

Figure 1:
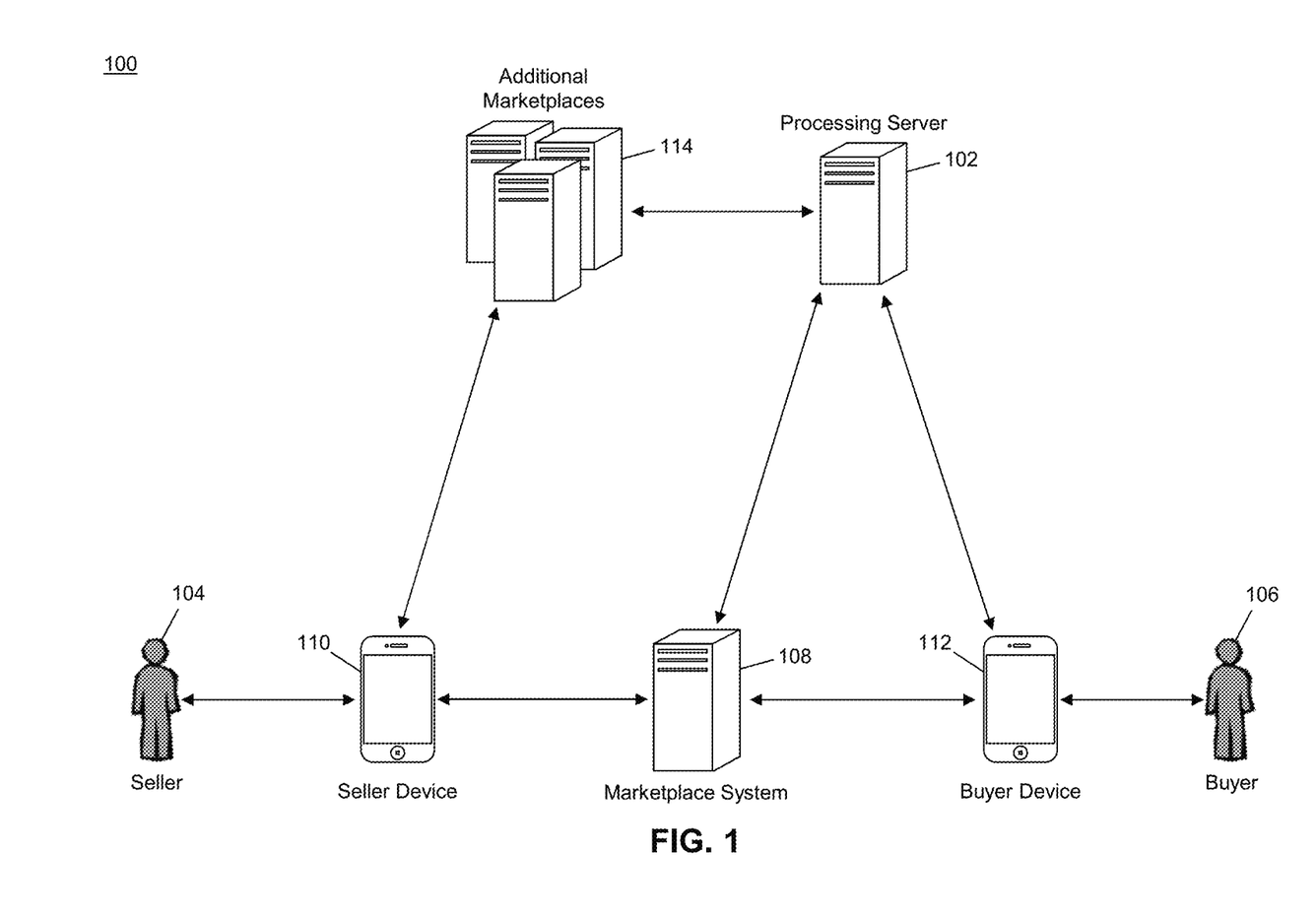
FIG. 1 is a block diagram illustrating a high level system architecture for providing confidences scores for users in an online marketplace in accordance with exemplary embodiments.

FIG. 1 illustrates a system 100 for the providing of confidence scores for users in an online marketplace that are based on objective evidence associated with user accounts including user activity on the online marketplace and other marketplaces that can also be attributed to the user. Each marketplace may be defined by a website or related websites that use a common server or server farm (e.g., Amazon, eBay, Etsy, etc.), or alternatively by a common theme or type of product or service offering (e.g., car market, craft market, etc.).

The system 100 may include a processing server 102. The processing server 102, discussed in more detail below, may be configured to generate and distribute confidence scores for users in an online marketplace based on past user activity on the online marketplace and other marketplaces by the same user. In an exemplary embodiment, the processing server 102 may be configured to only utilize objective activity (e.g., not subjective activity, such as feedback or ratings captured from other users) when identifying a confidence score. In other embodiments, subjective activity data may be used, but may be weighed accordingly when identifying the confidence score.

In the system 100, a seller 104 may have a product (e.g., a good or service) available for sale on an online marketplace. A buyer 106 may browse the online marketplace via connecting to a marketplace system 108 associated therewith, which may be a web server, application program server, or other hardware used to provide an interface to the buyer 106 and seller 104 for the sale of one or more products. The buyer 106 may identify that the seller 104 is selling the product and may be interested in obtaining a confidence score for the seller 104 to determine if the seller is trustworthy. The seller 104 and buyer 106 may each have computing devices used to interact with the marketplace system 108, illustrated in FIG. 1 as the seller device 110 and buyer device 112, respectively. Each of the devices may be any type of computing device suitable for interacting with the marketplace system 108 and the processing server 102 using any suitable communication network and method. For instance, the computing devices may be desktop computers, laptop computers, notebook computers, tablet computers, cellular phones, smart phones, smart watches, smart televisions, wearable computing devices, implantable computing devices, etc., and may communicate with the marketplace system 108 and/or processing server 102 using the Internet, a cellular communication network, a local area network, etc. via a web page, application program, application programming interface, short messaging service, e-mail, etc.

The seller 104 and buyer 106 may each register a user account with the marketplace system 108 using traditional methods. As part of the registration, the seller 104 and buyer 106 may each supply identifying information, which may include at least one account identifier, which may be a value that is unique to the user's account. The account identifier may be, for instance, an identification number, username, password, e-mail address, telephone number, etc. In some instances, a combination of non-unique data may serve as an account identifier. The marketplace system 108 may register each of the users, where the respective account identifier(s) may be used in communications exchanged therewith for identification of the user. The marketplace system 108 may provide the account identifiers to the processing server 102. In some embodiments, the processing server 102 may be external to the marketplace system 108 and may communicate with the marketplace system 108 using suitable communication networks and methods for communication between physically separated computing systems. In other embodiments, the processing server 102 may be part of the marketplace system 108 and may receive or otherwise access the account identifiers using internal communication methods.

The buyer 106 may identify the seller 104 from a listing for their product for sale and may request a confidence score of the seller 104 from the processing server 102. To request a confidence score, the buyer 106 may, using the buyer device 112, submit a confidence request to the processing server 102 that includes at least one account identifier associated with the seller 104. In some instances, the buyer 106 may manually input the account identifier into the buyer device 112, such as by typing the account identifier in an input field of a web page associated with the processing server 102. In other instances, the ability to submit a confidence request may be integrated into the marketplace system 108. For example, a screen in an application program for the marketplace system 108 that displays the product for sale by the seller 104 may have a hyperlink or other interactable element on display that, when interacted with by the buyer 106, submits the confidence request to the processing server 102 that includes an account identifier of the seller 104.

The processing server 102 may receive the confidence request and identify an account profile, discussed in more detail below, associated with the seller 104 using the received account identifier(s). The processing server 102 may then generate a confidence score for the seller 104. The confidence score may be based on user activity by the seller 104 in at least the online marketplace associated with the marketplace system 108. The user activity may include prior transactions (including number, frequency, value, type of products, etc.), overall usage of the marketplace (e.g., time registered, time visited, etc.), and, in some instances, may also include feedback, ratings, or other subjective data supplied by other users of the online marketplace to be applied to the seller 104. In some cases, the processing server 102 may only consider activity attributable to the seller 104 as a seller in past transactions if a confidence score is being measured as a seller for a proposed transaction. In other cases, activity attributable as a seller may be weighed more heavily than activity attributable as a buyer, or the processing server 102 may generate separate confidence scores for the seller 104 as a buyer or seller. In some instances, data associated with the seller device 110 may be used, such as a browser fingerprint, internet protocol address, media access control address, etc., where the use of multiple devices to access the user account and/or access at different periods of time or from different geographic locations may adversely affect confidence in the seller 104.

In an example, the seller 104 may be established on the online marketplace, having participated in several dozen transactions, but may not have received any feedback from other users in the online marketplace. The processing server 102 may identify this activity (e.g., in the account profile for the seller 104 stored therein based on activity data supplied by the marketplace system 108 or by requesting such activity data from the marketplace system 108 using the account identifier(s)) and may generate a confidence score showing significant confidence in the authenticity of the seller 104 if the seller 104 had successfully completed each of the several dozen transactions with no disputes or refunds provided. In some cases, the providing of refunds may positively affect the confidence score depending on the circumstance. For instance, if the refund is issued because of a shipping error and is promptly issued and addressed by the seller 104, it may be indicative of positive behavior by the seller 104.

In some embodiments, the processing server 102 may use activity by the seller 104 on other online marketplaces in the generation of the confidence score. The processing server 102 may be configured to receive activity data for users from additional marketplaces 114, where the activity may be associated with account identifiers associated with each respective user account in the additional marketplaces 114. When identifying a confidence score, the processing server 102 may identify all of the activity in the seller's account profile for the marketplace system 108, but may also identify all account profiles for additional marketplaces 114 that may be attributable to the seller 104 based on the account identifier(s) for the account profile with the marketplace system 108. For instance, if the seller 104 uses the same e-mail address for three additional marketplaces 114, the processing server 102 may identify the account profiles for the additional marketplaces 114 that includes the same e-mail address, and may take the activity data included in those account profiles into account when generating the confidence score. In some cases, the processing server 102 may weigh activity data in the online marketplace being used in the proposed transaction more heavily than activity data in additional marketplaces 114. In some instances, activity data for additional marketplaces 114 may have weight affected by the number of account identifiers used to identify the account profile. For example, if the only account identifier in common is a name or telephone number, the activity data attributable thereto may be weighed less than an account profile identified via e-mail address, name, and telephone number.

In some embodiments, the processing server 102 may also consider feedback from other users in the online marketplace when generating a confidence score. In some cases, the feedback data may have lesser weight than activity data associated with the seller's role in past transactions and other usage of the marketplace, such as to minimize the effect of false reviews and ratings. In some cases, confidence scores for users that have provided feedback on the seller 104 may be taken into account when weighting the effect of that feedback on the confidence score for the seller 104. For example, feedback on the seller 104 by established and respected users may be weighed more heavily than feedback by another user that has only participated in the one transaction.

The processing server 102 may consider all of the data available to generate a confidence score for the seller 104. The confidence score may be a measure of the confidence that the seller 104 is who they purport to be, the likelihood that they will follow through with the transaction, and the likelihood that the product available for sale is accurate to its description. In some cases, the processing server 102 may generate separate confidence scores for each of these aspects of the confidence in the seller 104. For instance, the seller 104 may always follow through with every transaction very reliable (and thus have a high confidence score associated therewith), but may regularly mislabel products that are sold, and have a confidence score related to products affected accordingly. The processing server 102 may provide the confidence score(s) for the seller 104 to the buyer 106, either directly via the buyer device 112 or through the marketplace system 108.

For instance, in a first example, the buyer 106 may submit the confidence score via a hyperlink in a web page of the online marketplace that displays the seller's product for sale. In such an example, the marketplace system 108 may submit the account identifier to the processing server 102, where the processing server 102 may generate the confidence score and return it to the marketplace system 108. The marketplace system 108 may then display the confidence score in a web page accessible by the buyer device 112. In some cases, the marketplace system 108 may request confidence scores from the processing server 102 for automatic display on any listing of the seller 104 or other user of the online marketplace. In such cases, the marketplace system 108 may request a confidence score each time a web page or other screen is loaded, or may receive regular confidence score updates for users (e.g., any time new activity occurs or after a predetermined period of time). In a second example, the buyer 106 may, using the buyer device 112, directly request a confidence score from the processing server 102, providing the seller's account identifier and an identifier associated with the marketplace system 108 for identification of the corresponding account profile. In such an example, the processing server 102 may return the confidence score directly to the buyer device 112.

The buyer device 112 may receive the confidence score for the seller 104 and decide how to proceed with the transaction accordingly. If the buyer 106 goes through with the transaction, the transaction may be conducted and activity data associated with the transaction provided to the processing server 102 by the marketplace system 108. The processing server 102 may store the activity data in an account profile for the seller 104 and for the buyer 106, which may be used in future confidence request determinations for both users. While the methods and systems discussed herein refer to generating confidence scores for a seller 104 to be used by a buyer 106, the processing server 102 may also generate confidence scores for buyers 106 for use by sellers 104 using the methods and systems discussed herein.

In some embodiments, the processing server 102 may be configured to use a blockchain for the storage of data used herein. A blockchain may be operated by a plurality of nodes comprising a blockchain network, and may be comprised of a plurality of blocks, where each block includes at least a block header and one or more data values. The block header may include at least a timestamp, block reference value, and data reference value. The block reference value may be a reference to the prior block added to the blockchain (e.g., determined by timestamp) and the data reference value may be a reference to the one or more data values included in the respective block. In an exemplary embodiment, the block reference value and data reference value may be hash values generated via the application of one or more hashing algorithms to the referred-to data, such that any modification to the corresponding data would necessitate re-generation of the reference value. As such, the blockchain may be immutable as any modification would necessarily be propagated through every remaining block. As each node in a blockchain network may independently possess the complete blockchain, such a modification would have to be performed on the blockchain in every node prior to the addition of a new block, making tampering with the blockchain near impossible.

The data values included in each block in the blockchain may include data stored for use by the processing server 102 or other entities or systems. For instance, in some cases, a blockchain may be used to store activity data. In such cases, each data value may include one or more account identifiers and activity data associated therewith for activity on an online marketplace, where there may be a single blockchain for all online marketplaces, or a separate blockchain for each online marketplace or user account. In some cases, a blockchain may be used to store confidence scores, where each data value may include one or more account identifiers and the associated confidence score, where new blocks may be added when a confidence score is updated, where there may be a single blockchain for all online marketplaces, or a separate blockchain for each online marketplace or user account. The use of a blockchain may ensure that activity data and/or confidence scores are not tampered with or misrepresented, as any system or entity in the system 100 may be able to validate each of the blocks in the blockchain and view the activity data and confidence scores freely. In some embodiments, the processing server 102 may be a node in the blockchain network and may be configured to generate new blocks (e.g., to include updated confidence scores or new activity data received from the marketplace system 108 or additional marketplaces 114) that are validated by other nodes and added to the blockchain. In other embodiments, the processing server 102, marketplace system 108, and additional marketplaces 114 may transmit data to be stored in the blockchain to a node in the blockchain network for addition thereto.

In some embodiments, the processing server 102 may be configured to utilize transaction data for payment transaction that are processed that involve the seller 104 in the generation of a confidence score associated therewith. In such embodiments, the seller 104 may provide a transaction account number or other data identifying a transaction account as part of the registration of one of the user accounts for the marketplace system 108 or an additional marketplace 114. In the processing server 102 has access to transaction data for payment transactions, the processing server 102 may use the primary account number to identify payment transactions in which the seller 104 participated, for use in generating the confidence score. In some cases, the seller 104 may be required to opt-in before transaction data for their payment transactions may be used. In some such embodiments, the processing server 102 may provide the primary account number or other identifying data to a third party system (e.g., a payment network), which may return transaction data or data analyzed therefrom (e.g., which may not include data associated with any specific transaction or used to personally identify the seller 104) for use by the processing server 102. In some such cases, the processing server 102 may be a part of the payment network or have access thereto.

The methods and systems discussed herein provide for the distribution of confidence scores to users in a proposed transaction in an online marketplace, where the confidence scores are based at least on objective data including user activity on the online marketplace. The result is that a buyer 106 or seller 104 may be able to receive a score for the other user even in cases where no feedback has been submitted about the user, such as if the user is attempting to participate in their very first transaction in an online marketplace. The use of user activity on the online marketplaces and, in some cases, also their activity on other marketplaces, may thus provide for greater confidence by users when participating in transactions that can not only negate the need for user feedback, but may also offset any attempt at fraud or deception via user feedback. For example, if a user has friends add fake feedback for the user to attempt to correct a negative or unfavorable rating, it may have no effect on the confidence score for the user that may be low due to the transaction activity used by the processing server 102, which may serve as a warning to the other user when approaching the transaction. Thus, the methods and systems discussed herein are specially configured to provide confidence scores for users based on objective data that have greater accuracy and applicability than traditional user feedback and that may also be useful across multiple online marketplaces.

Processing Server

Figure 2:
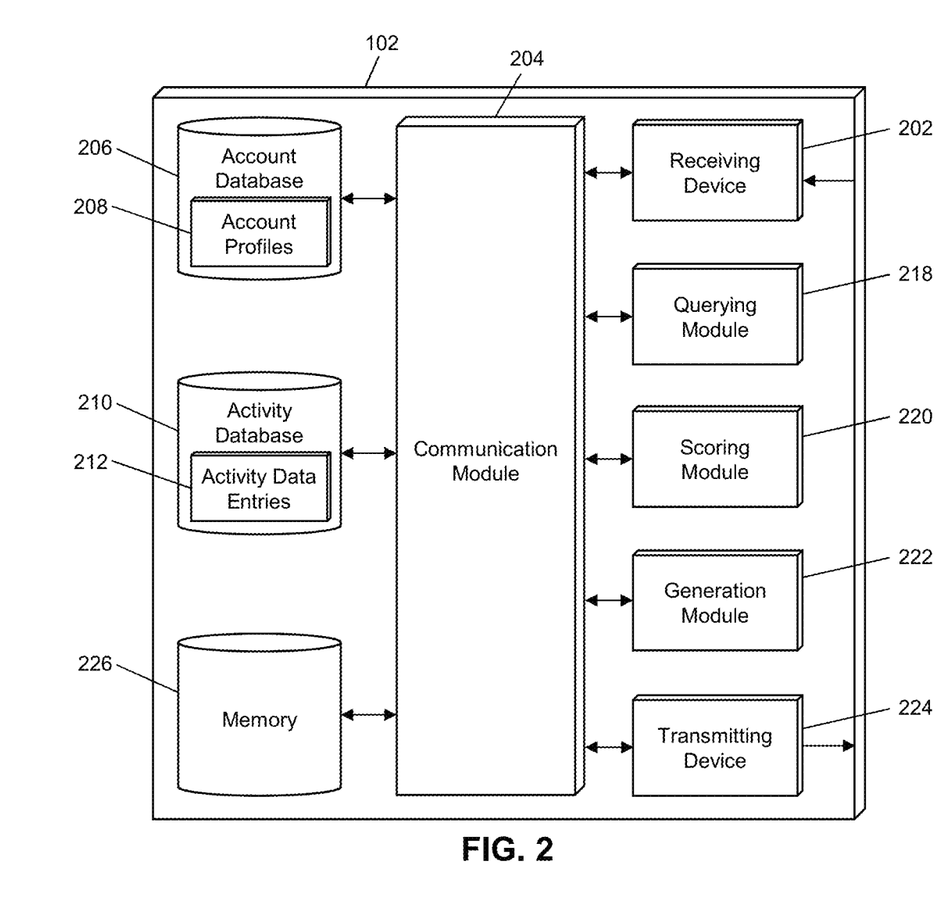
FIG. 2 is a block diagram illustrating the processing server of the system of FIG. 1 for providing confidence scores for users in an online marketplace in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from marketplace systems 108, seller devices 110, buyer devices 112, additional marketplaces 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by marketplace systems 108 and additional marketplaces 114 that may be superimposed or otherwise encoded with account registration data, including account identifiers associated with a user account registered with the respective online marketplace, and/or activity data associated with user activity on the respective online marketplace, including activity for transactions involving the respective user as well as activity regarding access to and usage of the respective online marketplace itself (e.g., device data, access times, areas accessed, etc.). The receiving device 202 may also be configured to receive data signals electronically transmitted by marketplace systems 108, seller devices 110, or buyer devices 112 that may be superimposed or otherwise encoded with confidence requests, which may include at least one account identifier associated with a user account for which a confidence score is requested. In some cases, a confidence request may also indicate a specific category for which a confidence score is requested, such as a score as a seller 104 or buyer 106 or a score regarding accuracy of product descriptions. In embodiments where a blockchain may be utilized, the receiving device 202 may be configured to receive data signals electronically transmitted by nodes in a blockchain network. In cases where transaction data may be utilized, the receiving device 202 may be configured to receive data signals electronically transmitted by payment networks that are superimposed or otherwise encoded with transaction data or data associated therewith.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, scoring module 220, generation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a user account with an online marketplace. An account profile 208 may include at least one or more account identifiers associated with the related user account in the online marketplace. In some cases, an account profile 208 may include a marketplace identifier associated with the online marketplace for identification thereof. In some embodiments, an account profile 208 may include confidence scores generated for the related user account. In some cases, an account profile 208 may also include activity data associated with activity of the related user account. In other cases, activity data may be separately stored in an activity database.

The activity database 210 may be configured to store a plurality of activity data entries 212 using a suitable data storage format and schema. The activity database 210 may be a relational database that utilizes structured query language for the storage, identification, modifying, updating, accessing, etc. of structured data sets stored therein. Each activity data entries 212 may be a structured data set configured to store data related to a user activity within an online marketplace. An activity data entry 212 may be related to, for instance, a conducted transaction, proposed transaction, disputed transaction, transaction refund, access to the online marketplace, modification to the user account, etc. Each activity data entry 212 may include at least an account identifier associated with the user account for which the activity occurred. Additional data stored in an activity data entry 212 may be based on the type of activity. For instance, an activity data entry 212 for a proposed transaction may include product information, pricing information, etc., whereas an activity data entry 212 for user access to the online marketplace may include an access time and a listing of areas accessed and for what period of time. In embodiments where a blockchain may be used to store user activity data, the activity database 210 may be a blockchain, where the activity data entries 212 may be included as the data values stored in blocks included in the blockchain.

The processing server 102 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the processing server 102 as necessary. The querying module 218 may, for example, execute a query on the account database 206 to identify an account profile 208 for a confidence request based on an account identifier included therein, and may then execute another query on the account database 206 to identify account profiles 208 for user accounts on additional marketplaces 114 associated with the same user based on other account identifiers parsed from the first identified account profile 208.

The processing server 102 may also include a scoring module 220. The scoring module 220 may be configured to generate confidence scores for use by the processing server 102 to perform the functions discussed herein. The scoring module 220 may receive data as input, may generate a confidence score based on the data, and may output the confidence score to another module or engine of the processing server 102. The scoring module 220 may, for example, generate one or more confidence scores based on user activity data, such as by being supplied with activity data entries 212 identified for an account profile 208. In some cases, the scoring module 220 may receive activity data entries 212 for multiple user accounts and/or may utilize different types of activity data entries 212 (e.g., for transactional activity, account access, marketplace access, etc.) and may weight activity data entries 212 differently based thereon. In some embodiments, the scoring module 220 may be configured to generate a plurality of confidence scores for a single account profile 208, such as a separate buyer score, seller score, product authenticity score, transaction fulfillment score, etc.

The processing server 102 may also include a generation module 222. The generation module 222 may be configured to generate data for use by the processing server 102 in performing the functions discussed herein. The generation module 222 may receive instructions as input, may generate data based on the instructions, and may output the data to another module or engine of the processing server 102. The generation module 222 may, for example, generate data messages that include confidence scores for distribution to marketplace systems 108, seller devices 110, and buyer devices 112 for use by users thereof. In embodiments where the processing server 102 may be a node in a blockchain network, the generation module 222 may be configured to generate data values, block headers, and new blocks for validation by other nodes in the blockchain network and addition to the associated blockchain.

The processing server 102 may also include a transmitting device 224. The transmitting device 224 may be configured to transmit data over one or more networks via one or more network protocols. In some instances, the transmitting device 224 may be configured to transmit data to marketplace systems 108, seller devices 110, buyer devices 112, additional marketplaces 114, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to marketplace systems 108, seller devices 110, buyer devices 112, and/or additional marketplaces 114 that are superimposed or otherwise encoded with one or more confidence scores and an account identifier associated therewith. In some cases, the transmitting device 224 may be configured to electronically transmit data signals to marketplace systems 108 and additional marketplaces 114 that are superimposed or otherwise encoded with activity requests, which may include one or more account identifiers to request activity data associated therewith. In embodiments where a blockchain may be used for data storage, the transmitting device 224 may be configured to transmit data values and/or blocks to nodes in a blockchain network associated with the blockchain. In embodiments where transaction data may be used in confidence scores, the transmitting device 224 may be configured to electronically transmit data signals to payment networks or other entities that are superimposed or otherwise encoded with data identifying a transaction account for request of transaction data associated therewith.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, algorithms for use by the scoring module 220, marketplace identifiers, blockchain data, communication data for blockchain nodes, hashing algorithms for generating and/or validating blockchain blocks, etc.

Process for Generating Confidence Scores in Online Marketplaces

Figure 3:
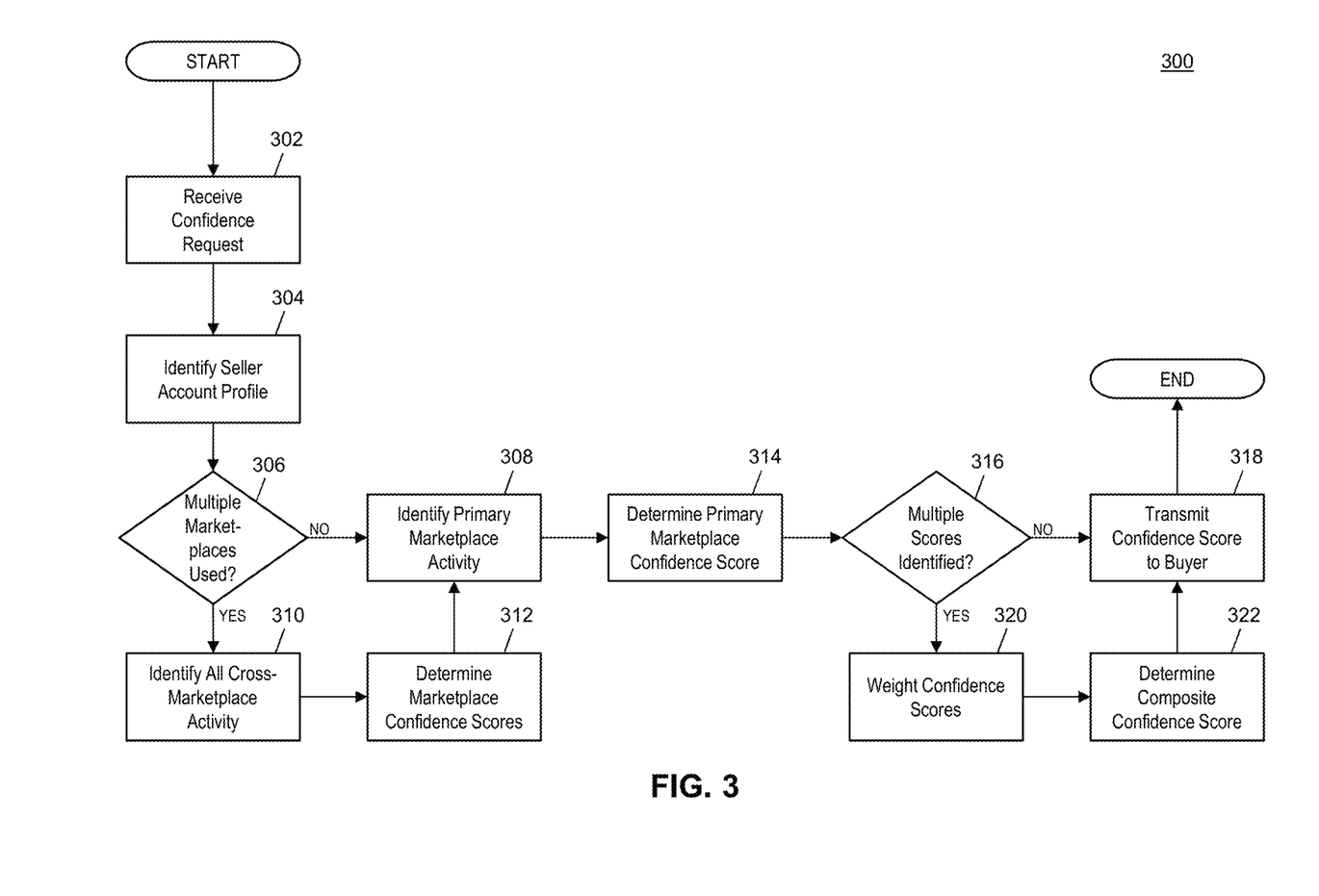
FIG. 3 is a flow diagram illustrating a process for the identification of a confidence score for a seller in an online marketplace using the processing server of FIG. 2 in accordance with exemplary embodiments.

FIG. 3 illustrates an example process executed by the processing server 102 in the system 100 of FIG. 1 for the generation of a confidence score for a seller 104 in an online marketplace.

In step 302, the receiving device 202 of the processing server 102 may receive a confidence request from a buyer device 112 or from the marketplace system 108 based on input received from the buyer device 112. The confidence request may include at least an account identifier associated with a user account corresponding to a seller 104 of a proposed transaction in an online marketplace associated with the marketplace system 108. In some cases, the confidence request may include a marketplace identifier associated with the online marketplace. In step 304, the querying module 218 of the processing server 102 may execute a query on the account database 206 of the processing server 102 to identify an account profile 208 that includes the account identifier, and marketplace identifier, if applicable, included in the received confidence request.

In step 306, the processing server 102 may determine if multiple online marketplaces are used by the seller 104. The determination may be based on the results of a query executed on the account database 206 by the querying module 218 to identify additional account profiles 208 in the account database 206 that include the account identifiers in the first identified account profile 208 that include different marketplace identifiers. If no other online marketplace accounts associated with the seller 104 are identified, then, in step 308, the querying module 218 of the processing server 102 may execute a query on the activity database 210 of the processing server 102 to identify activity data entries associated with activity by the seller 104 on the online marketplace associated with the marketplace system 108, referred to herein as the primary marketplace, where the activity data entries 212 include an account identifier from the account profile 208 and the marketplace identifier associated with the primary marketplace.

If, in step 306, the querying module 218 identifies other account profiles 208 associated with user accounts of the seller 104 on secondary marketplaces, then, in step 310, the querying module 218 may execute a query on the activity database 210 for each secondary marketplace to identify activity data entries 212 associated with activity thereon by the seller 104, where the activity data entries 212 may include one or more account identifiers from the account profile 208 identified for the respective secondary marketplace and the marketplace identifier associated therewith. In step 312, the scoring module 220 of the processing server 102 may generate a confidence score for the seller 104 for each of the secondary marketplace based on the activity data entries 212 identified for each respective marketplace. The process 300 may then proceed to step 308 where the seller's activity on the primary marketplace is identified.

Once the seller's activity on the primary marketplace is identified, then, in step 314, the scoring module 220 of the processing server 102 may generate a confidence score for the seller for the primary marketplace, which may be based on the activity data stored in the activity data entries 212 identified by the querying module 218 for the primary marketplace. In step 316, the processing server 102 may determine if multiple confidence scores were identified for the seller 104, which may have been performed if additional user accounts for the seller 104 were identified. If a confidence score was generated for the seller 104 for only the primary marketplace, then, in step 318, the transmitting device 224 of the processing server 102 may electronically transmit the confidence score along with the account identifier included in the confidence request to the buyer device 112 either directly thereto or via the marketplace system 108, where the confidence score may be transmitted in response to the received confidence request.

If, in step 316, the processing server 102 determines that multiple confidence scores had been generated for the seller 104, then, in step 320, the scoring module 220 of the processing server 102 may apply weights to the confidence scores generated for each of the secondary marketplaces as well as the confidence score generated for the primary marketplace. In some cases, the primary marketplace confidence score may be weighed more heavily than the confidence scores generated for the secondary marketplaces. The weighting may be based on feedback received by users of the system 100, such as feedback concerning the accuracy of confidence scores where weighting may be adjusted to maximize the accuracy of confidence scores. Weighting may consider any suitable criteria, such as similarities between a secondary marketplace and the primary marketplace (e.g., transaction type, good type, platform, etc.), amount of activity, age of user account, amount of feedback from other users, etc. In step 322, the scoring module 220 may generate a composite confidence score for the seller 104 based on the confidence scores generated for each marketplace and their corresponding weight. The process 300 may then proceed to step 318, where the transmitting device 224 may electronically transmit the composite confidence score to the buyer device 112 for use by the buyer 106.

Figure 4:
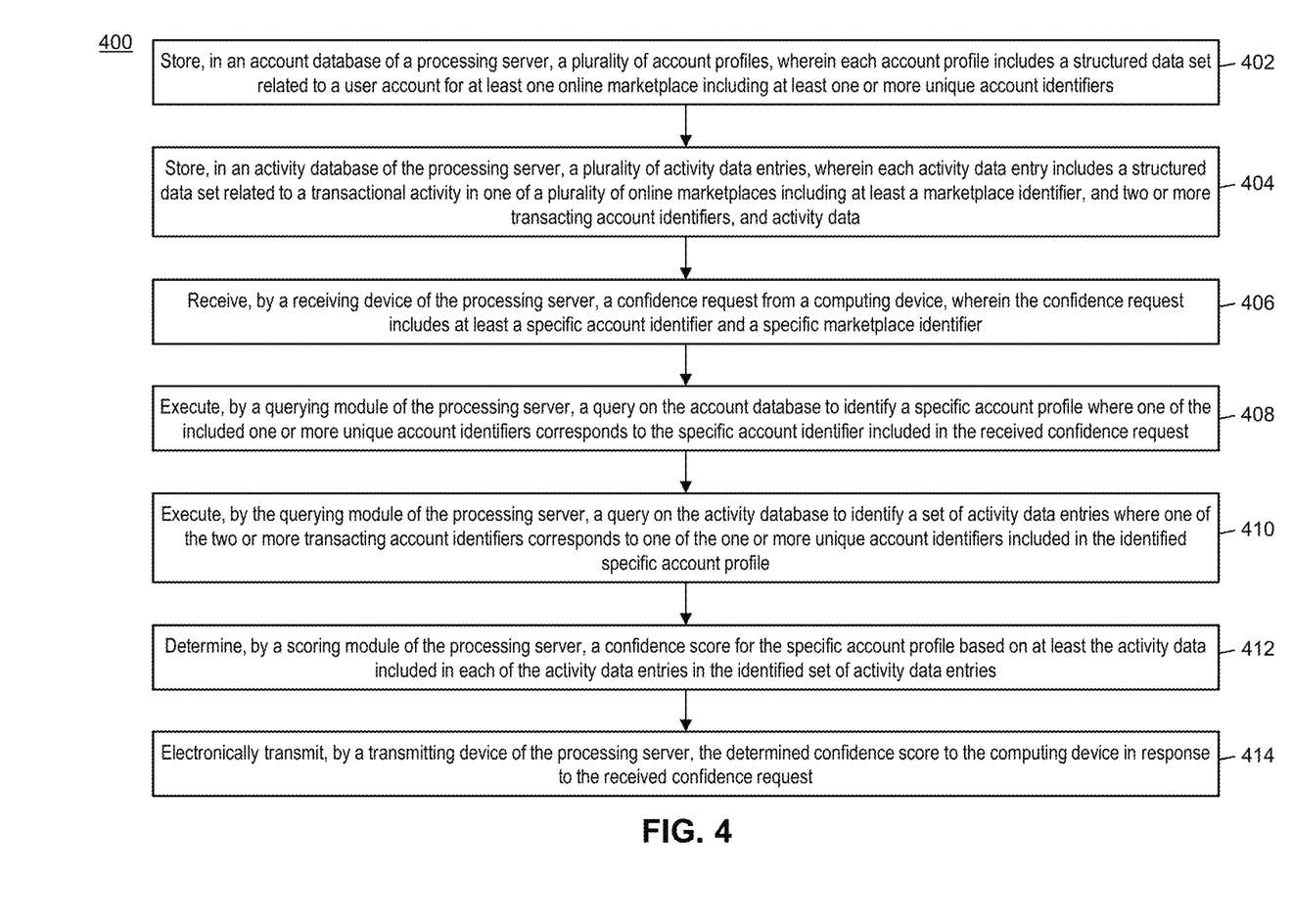
FIG. 4 is a flow chart illustrating an exemplary method for providing a confidence score for a seller in an online marketplace in accordance with exemplary embodiments.

Exemplary Method for Providing a Confidence Score for a Seller in an Online Marketplace FIG. 4 illustrates a method 400 for the generation of a confidence score for a user in an online marketplace based on activity data in at least the same online marketplace and the providing thereof based on a received confidence request.

In step 402, a plurality of account profiles (e.g., account profiles 208) may be stored in an account database (e.g., the account database 206) of a processing server (e.g., the processing server 102), wherein each account profile includes a structured data set related to a user account for at least one online marketplace including at least one or more unique account identifiers. In step 404, a plurality of activity data entries (e.g., activity data entries 212) may be stored in an activity database (e.g., the activity database 210) of the processing server, wherein each activity data entry includes a structured data set related to a transactional activity in one of a plurality of online marketplaces including at least a marketplace identifier, and two or more transacting account identifiers, and activity data.

In step 406, a confidence request may be received by a receiving device (e.g., the receiving device 202) of the processing server from a computing device (e.g., buyer device 112, seller device 110, marketplace system 108, etc.), wherein the confidence request includes at least a specific account identifier and a specific marketplace identifier. In step 408, a query may be executed on the account database by a querying module (e.g., the querying module 218) of the processing server to identify a specific account profile where one of the included one or more unique account identifiers corresponds to the specific account identifier included in the received confidence request.

In step 410, a query may be executed on the activity database by the querying module of the processing server to identify a set of activity data entries where one of the two or more transacting account identifiers corresponds to one of the one or more unique account identifiers included in the identified specific account profile. In step 412, a confidence score may be determined by a scoring module (e.g., the scoring module 220) of the processing server for the specific account profile based on at least the activity data included in each of the activity data entries in the identified set of activity data entries. In step 414, the determined confidence score may be electronically transmitted by a transmitting device (e.g., the transmitting device 224) of the processing server to the computing device in response to the received confidence request.

In one embodiment, the marketplace identifier included in each of the activity data entries in the identified set of activity data entries may correspond to the specific marketplace identifier included in the received confidence request. In some embodiments, the activity database may be comprised of a blockchain, the blockchain may include a plurality of blocks, where each block includes at least a block header and one or more data values, and each of the plurality of activity data entries may be one of the one or more data values included in one of the plurality of blocks. In a further embodiment, each block header may include at least a timestamp, a block reference value, and an activity reference value, where the block reference value is a unique value that refers to a prior block of the plurality of blocks and the activity reference value is a unique value that refers to the one or more data values included in the block that includes the respective block header.

In one embodiment, at least one of the activity data entries included in the identified set of activity data entries may include one of a plurality of separate marketplace identifiers different from the specific marketplace identifier included in the received confidence request. In a further embodiment, activity data included in activity data entries in the identified set of activity data entries that include the specific marketplace identifier may have a greater weight on the confidence score than activity data included in activity data entries in the identified set of activity data entries that include one of the plurality of separate marketplace identifiers. In another further embodiment, determining the confidence score may include determining a first confidence score for activity data entries in the set of activity data entries that includes the specific market place identifier and a plurality of additional confidence scores for each of the plurality of separate marketplace identifiers based on activity data in the set of activity data entries that includes the respective separate marketplace identifier, and determining the confidence score based on the determined first confidence score and the plurality of additional confidence scores. In an even further embodiment, the first confidence score may have a greater weight on the confidence score than each of the additional confidence scores.

In some embodiments, the one or more unique account identifiers may include at least one of: username, e-mail address, telephone number, primary account number, identification number, user identification value, browser fingerprint, media access control address, and internet protocol address. In one embodiment, the activity data may include at least one of: transaction time, transaction date, transaction amount, geographic location, feedback rating, media access control address, telephone number, and internet protocol address.

Computer System Architecture

Figure 5:
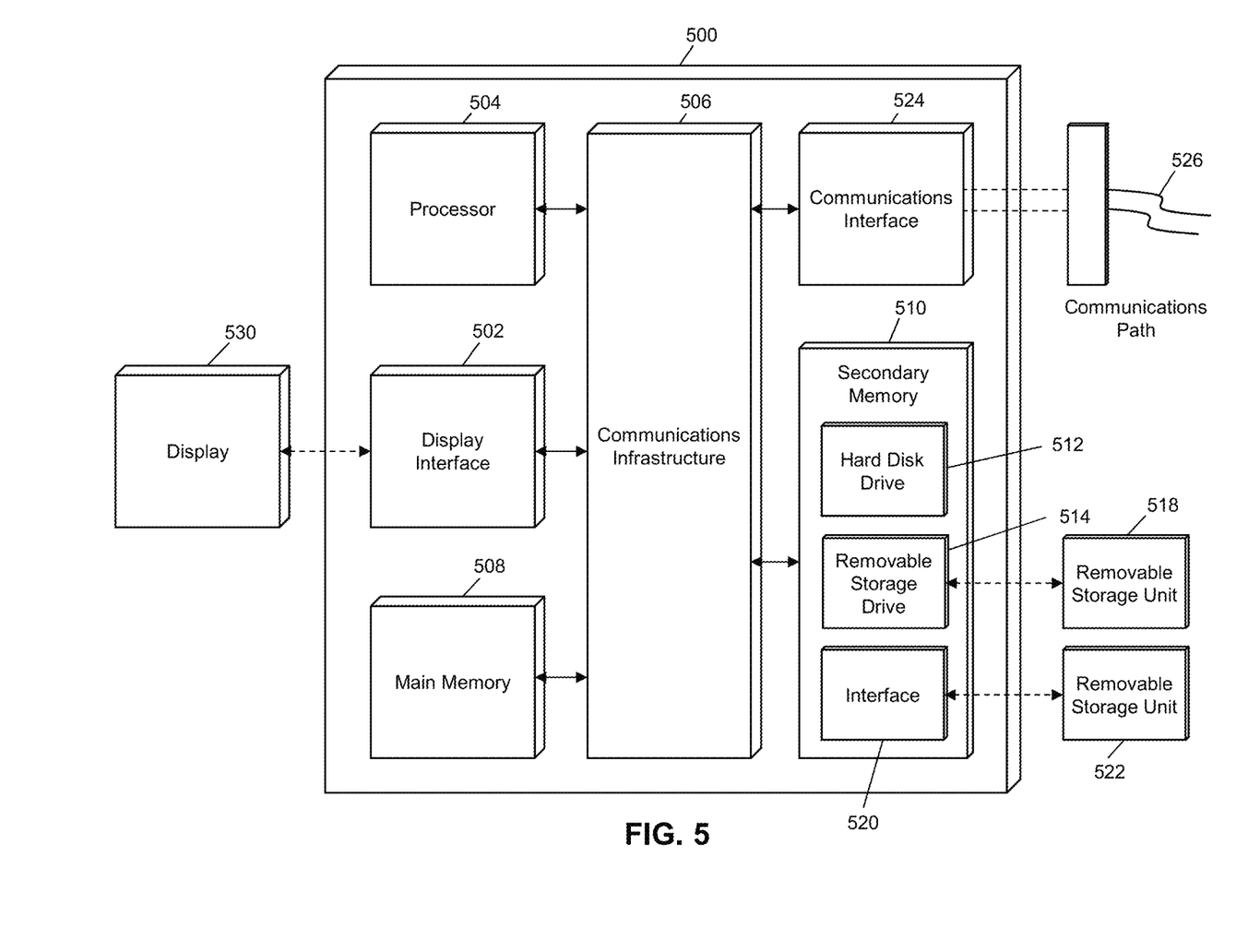
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for providing confidence scores for users in online marketplaces. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing a confidence score for a seller in an online marketplace, comprising:
    storing, in an account database of a processing server, a plurality of account profiles, wherein each account profile includes a structured data set related to a user account for at least one online marketplace including at least one or more unique account identifiers;
    storing, in an activity database of the processing server, a plurality of activity data entries, wherein each activity data entry includes a structured data set related to a transactional activity in one of a plurality of online marketplaces including at least aa marketplace identifier, (ii) one or more transacting account identifiers, and (iii) activity data, wherein the structured data set related to the transactional activity in each activity data entry of at least a subset of the activity data entries includes (i) a first transacting account identifier of the respective one or more transacting account identifiers being associated with seller transactional activity involving the corresponding first transacting account identifier, and (ii) a second transacting account identifier of the respective one or more transacting account identifiers being associated with buyer transactional activity involving the corresponding second transacting account identifier;
    receiving, by a receiving device of the processing server from a computing device, a confidence request associated with a seller, wherein the confidence request includes at least a specific account identifier associated with the seller and a specific marketplace identifier;
    executing, by a querying module of the processing server, a query on the account database to identify a specific account profile where one of the included one or more unique account identifiers corresponds to the specific account identifier included in the received confidence request;
    executing, by the querying module of the processing server, a query on the activity database to identify a set of activity data entries where one of the one or more transacting account identifiers corresponds to one of the one or more unique account identifiers included in the identified specific account profile, wherein at least one of the activity data entries in the identified set of activity data entries includes at least one activity data entry including a corresponding transacting account identifier associated with buyer transactional activity;
    determining, by a scoring module of the processing server, a confidence score for the specific account profile based on at least the activity data included in each of the activity data entries in the identified set of activity data entries including the at least one activity data entry including a corresponding transacting account identifier associated with buyer transactional activity; and
    electronically transmitting, by a transmitting device of the processing server, the determined confidence score to the computing device in response to the received confidence request.

2. The method of claim 1, wherein the marketplace identifier included in each of the activity data entries in the identified set of activity data entries corresponds to the specific marketplace identifier included in the received confidence request.

3. The method of claim 1, wherein at least one of the activity data entries included in the identified set of activity data entries includes one of a plurality of separate marketplace identifiers different from the specific marketplace identifier included in the received confidence request.

4. The method of claim 3, wherein activity data included in activity data entries in the identified set of activity data entries that include the specific marketplace identifier have a greater weight on the confidence score than activity data included in activity data entries in the identified set of activity data entries that include one of the plurality of separate marketplace identifiers.

5. The method of claim 3, wherein determining the confidence score includes
    determining a first confidence score for activity data entries in the set of activity data entries that includes the specific market place identifier and a plurality of additional confidence scores for each of the plurality of separate marketplace identifiers based on activity data in the set of activity data entries that includes the respective separate marketplace identifier, and
    determining the confidence score based on the determined first confidence score and the plurality of additional confidence scores.

6. The method of claim 5, wherein the first confidence score has a greater weight on the confidence score than each of the additional confidence scores.

7. The method of claim 1, wherein
    the activity database is comprised of a blockchain,
    the blockchain includes a plurality of blocks, where each block includes at least a block header and one or more data values, and
    each of the plurality of activity data entries is one of the one or more data values included in one of the plurality of blocks.

8. The method of claim 7, wherein each block header includes at least a timestamp, a block reference value, and an activity reference value, where the block reference value is a unique value that refers to a prior block of the plurality of blocks and the activity reference value is a unique value that refers to the one or more data values included in the block that includes the respective block header.

9. The method of claim 1, wherein the one or more unique account identifiers includes at least one of: username, e-mail address, telephone number, primary account number, identification number, user identification value, browser fingerprint, media access control address, and internet protocol address.

10. The method of claim 1, wherein the activity data includes at least one of: transaction time, transaction date, transaction amount, geographic location, feedback rating, media access control address, telephone number, and internet protocol address.

11. A system for providing a confidence score for a seller in an online marketplace, comprising:
    a processing server comprising a processor; and a memory storing executable instructions, that when executed by the processor, causes the processor to perform the steps of:
  storing, by an account database of the processing server, plurality of account profiles, wherein each account profile includes a structured data set related to a user account for at least one online marketplace including at least one or more unique account identifiers;
  storing, by an activity database of the processing server, a plurality of activity data entries, wherein each activity data entry includes a structured data set related to a transactional activity in one of a plurality of online marketplaces including at least (i) a marketplace identifier, (ii) one or more transacting account identifiers, and (iii) activity data, wherein the structured data set related to the transactional activity in each activity data entry of at least a subset of the activity data entries includes (i) a first transacting account identifier of the respective one or more transacting account identifiers being associated with seller transactional activity involving the corresponding first transacting account identifier, and (ii) a second transacting account identifier of the respective one or more transacting account identifiers being associated with buyer transactional activity involving the corresponding second transacting account identifier;
  receiving, by a receiving device of the processing server from a computing device, a confidence request associated with a seller, wherein the confidence request includes at least a specific account identifier associated with a seller and a specific marketplace identifier;
  executing, by a querying module of the processing server, query on the account database to identify a specific account profile where one of the included one or more unique account identifiers corresponds to the specific account identifier included in the received confidence request,
  executing, by the querying module of the processing server, a query on the activity database to identify a set of activity data entries where one of the two one or more transacting account identifiers corresponds to one of the one or more unique account identifiers included in the identified specific account profile, wherein at least one of the activity data entries in the identified set of activity data entries includes at least one activity data entry including a corresponding transacting account identifier associated with buyer transactional activity;
  determining, by a scoring module of the processing server, a confidence score for the specific account profile based on at least the activity data included in each of the activity data entries in the identified set of activity data entries including the at least one activity data entry including a corresponding transacting account identifier associated with buyer transactional activity; and
  electronically transmitting, by a transmitting device of the processing server the determined confidence score to the computing device in response to the received confidence request.

12. The system of claim 11, wherein the marketplace identifier included in each of the activity data entries in the identified set of activity data entries corresponds to the specific marketplace identifier included in the received confidence request.

13. The system of claim 11, wherein at least one of the activity data entries included in the identified set of activity data entries includes one of a plurality of separate marketplace identifiers different from the specific marketplace identifier included in the received confidence request.

14. The system of claim 13, wherein activity data included in activity data entries in the identified set of activity data entries that include the specific marketplace identifier have a greater weight on the confidence score than activity data included in activity data entries in the identified set of activity data entries that include one of the plurality of separate marketplace identifiers.

15. The system of claim 13, wherein determining the confidence score includes
  determining a first confidence score for activity data entries in the set of activity data entries that includes the specific market place identifier and a plurality of additional confidence scores for each of the plurality of separate marketplace identifiers based on activity data in the set of activity data entries that includes the respective separate marketplace identifier, and
  determining the confidence score based on the determined first confidence score and the plurality of additional confidence scores.

16. The system of claim 15, wherein the first confidence score has a greater weight on the confidence score than each of the additional confidence scores.

17. The system of claim 11, wherein
  the activity database is comprised of a blockchain,
  the blockchain includes a plurality of blocks, where each block includes at least a block header and one or more data values, and
  each of the plurality of activity data entries is one of the one or more data values included in one of the plurality of blocks.

18. The system of claim 17, wherein each block header includes at least a timestamp, a block reference value, and an activity reference value, where the block reference value is a unique value that refers to a prior block of the plurality of blocks and the activity reference value is a unique value that refers to the one or more data values included in the block that includes the respective block header.

19. The system of claim 11, wherein the one or more unique account identifiers includes at least one of: username, e-mail address, telephone number, primary account number, identification number, user identification value, browser fingerprint, media access control address, and internet protocol address.

20. The system of claim 11, wherein the activity data includes at least one of: transaction time, transaction date, transaction amount, geographic location, feedback rating, media access control address, telephone number, and internet protocol address.

* * * * *